J. P. RAVELO.
AUTOMOBILE BODY MOUNTING.
APPLICATION FILED SEPT. 4, 1920.
1,369,191.
Patented Feb. 22, 1921.
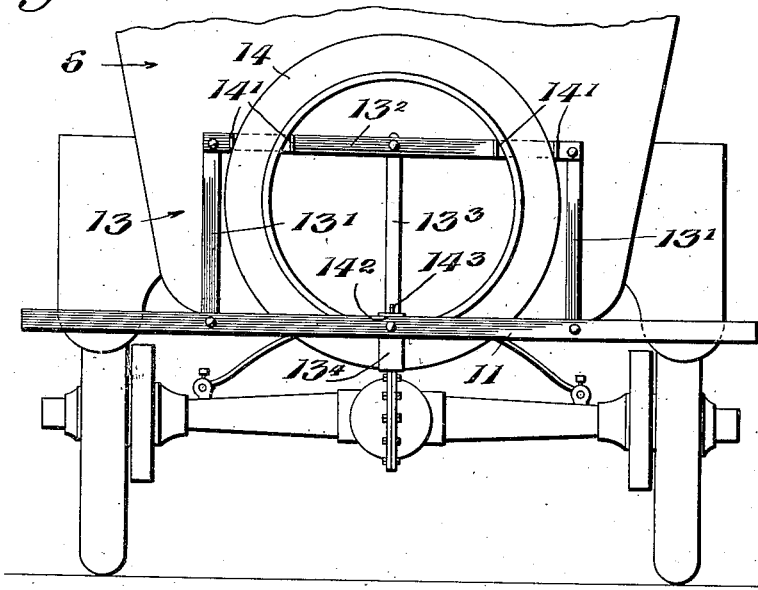
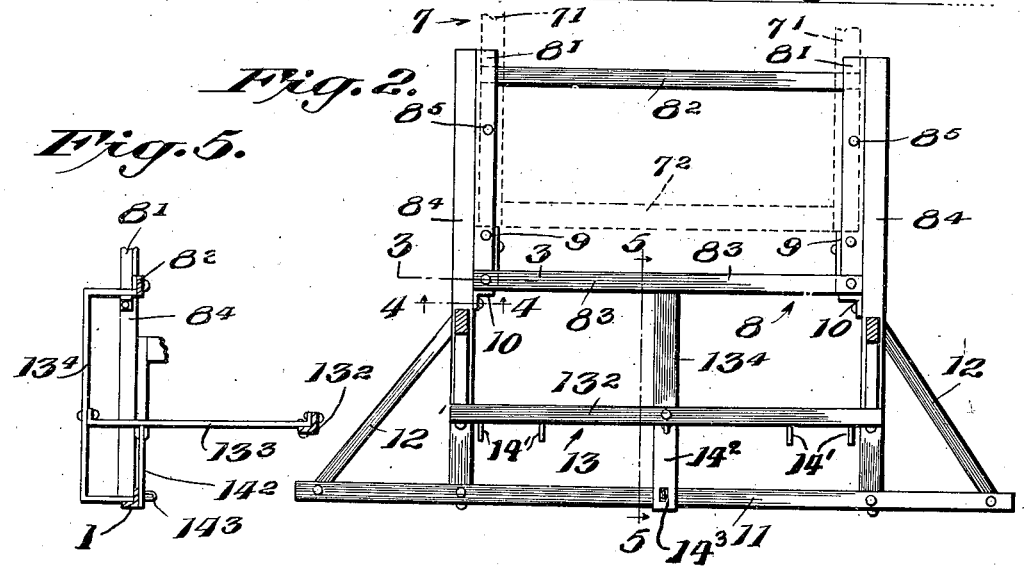
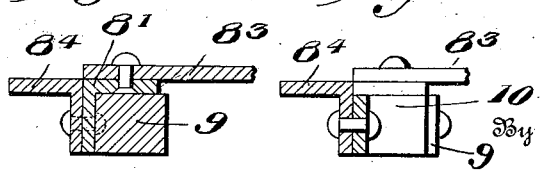
Inventor
Juan P. Ravelo,
By Lawrence Langner
Attorney

UNITED STATES PATENT OFFICE.

JUAN P. RAVELO, OF HABANA, CUBA.

AUTOMOBILE-BODY MOUNTING.

1,369,191.  Specification of Letters Patent.  Patented Feb. 22, 1921.

Application filed September 4, 1920. Serial No. 408,315.

*To all whom it may concern:*

Be it known that I, JUAN P. RAVELO, a citizen of the Republic of Cuba, residing at Habana, Cuba, have invented certain new and useful Improvements in Automobile-Body Mountings, of which the following is a specification.

This invention relates to mountings for automobile bodies; and it resides in the provision of an improved mounting which is designed to accurately and securely hold the body in place on the chassis of the automobile and to prevent it from becoming distorted or worn due to the excessive strains or stresses to which it is usually subjected.

The invention is especially applicable to automobiles of the Ford type, in which the body of the car is provided at its bottom with a pair of longitudinal beams which constitute its support and which are attached in some suitable manner to the chassis. These beams are usually made of wood, and for that reason often fail to sustain the car body with sufficient rigidity to withstand vibration, but, on the contrary, permit it to work loose from the chassis at various points, particularly at its rear portion where the strains and wear are greatest, the result beng that warping soon takes place, and the doors stick or fail to properly close.

According to the present invention, a rigid metal framework is provided, on which the rear portion of the car body directly rests and to which it is securely fastened and this framework, in turn, is fitted over and secured to the rear portion of the chassis, so that it acts as a reinforcement or brace both for the chassis and for the body, thus maintaining the latter rigidly in position and preventing it from rapidly becoming worn or strained.

The invention further resides in the construction of the reinforcing framework in such a manner that its rear portion forms a spare wheel or tire carrier and also acts to additionally brace the framework itself.

In the accompanying drawing:

Figure 1 is a rear elevation of an automobile equipped with the improved supporting framework.

Fig. 2 is a plan view of the framework.

Figs. 3, 4 and 5 are enlarged sectional views taken, respectively, on lines 3—3, 4—4 and 5—5 of Fig. 2.

Referring more particularly to the drawing, 6 indicates the body of a Ford or other car, and 7 the chassis thereof; the latter being indicated in dotted lines in Fig. 2 and comprising the usual side beams 7' and end beam 7².

The reinforcing framework, in which the invention primarily resides, as has already been stated, is generally designated 8 and, as shown, comprises a pair of inner longitudinal or side beams 8', front and rear cross-beams 8² and 8³ connecting the ends thereof, and a pair of outer longitudinal or side beams 8⁴. The inner beams 8' are of angle-iron construction, and are so spaced as to fit over the side beams 7' of the chassis, the latter beams abutting at their free ends against a pair of stop blocks 9 which are suitably fastened to the framework beams 8' and which are overhung by the horizontal wings of said beams 8'. The cross-beams 8² and 8³ are in the form of flat metal strips whose ends respectively underlie and overlie the adjacent portions of the aforesaid horizontal wings of beams 8'; and the outer side beams 8⁴, like the inner beams, are formed of angle-irons and have their vertical wings disposed immediately against, and riveted to, those of the inner beams. The stop blocks 9 are preferably connected to these beams 8⁴ by means of angle brackets 10, which are arranged vertically to fit in the corners or seats formed between the rear end faces of the blocks and the vertical wings of said beams, in which seats or corners they are riveted or otherwise fastened.

The outer beams 8⁴ are considerably longer than the inner beams 8', and project rearwardly beyond the same, their free rear ends being fastened to a transversely-arranged end beam 11; the ends of which extend beyond the beams 8⁴ and are connected thereto by diagonal braces 12. The projecting portions of the beams 8⁴ are utilized to support an auxiliary frame 13, here shown as comprising a pair of upright, angle-iron bars 13', fastened at their lower ends to said portions, and a horizontal cross-bar 13² which connects the upper ends of the bars 13'. The cross-bar 13² has connected to its center the upper end of a vertical bar 13³ (Fig. 1), whose lower end is fastened to a U-shaped beam 13⁴, the upturned ends or arms of which are fastened to the end beam 11 and the rear cross-beam 8³ of the main frame 8; the said beam 13⁴ being disposed parallel with, and midway between, the outer side beams 8⁴. The horizontal body portion of the U-beam 13⁴ is disposed some distance below the plane of the parts 8³, 8⁴ and 11, and acts as a support for the lower portion of a spare tire or wheel 14 (Fig. 1), the upper portion of which fits between pairs of spaced projections or lugs 14' attached to the top member 13² of the auxiliary frame and extending rearwardly therefrom. Locking means are preferably provided to retain the tire in place against its holder, such means comprising a plate 14² which is pivoted at one end to the upright 13³ and is engageable at its other end with a keeper 14³ on the end beam 11.

In use, the main framework 8 is fastened to the usual side beams on the bottom of the car body 6 (for instance, by means of bolts inserted through holes 8⁵ formed in the beams 8'), and is then slid over the chassis of the car until the side beams 7' of the chassis strike against the stop blocks 9. When so positioned, the framework will constitute a solid reinforcement for the rear portion of the car floor; the side beams of the framework also reinforcing the rear portion of the chassis. The auxiliary frame 13 serves both as a tire holder or carrier and as a protector for the rear portion of the body.

I claim as my invention:—

1. A mounting for automobile bodies, comprising a metal frame for attachment to the bottom of the body including a pair of spaced, angle-iron side beams and front and rear cross-beams connecting the same, said side beams adapted to extend along the outer side faces of the side beams of the chassis and having horizontal, inwardly-projecting wings which overlie the upper faces of said chassis beams, and stop blocks fitted in the rear corners of the frame for engagement by the rear ends of the chassis side beams.

2. A mounting for automobile bodies, comprising a main metal frame for attachment to the body including connected outer and inner pairs of angle-iron side beams, and front and rear cross-beams connecting the ends of the inner side beams; said inner side beams adapted to extend along the outer side faces of the side beams of the chassis and having horizontal, inwardly-projecting wings which overlie the upper faces of said chassis beams, and the outer side beams of the frame extendingly rearwardly beyond the inner side beams and having a transversely-arranged end beam connecting their rear ends; stop blocks fitted in the rear corners of the frame for engagement by the rear ends of the chassis side beams, and an auxiliary reinforcing frame attached to the rearwardly-extending portions of the said outer side beams and connecting the same together.

3. A mounting for automobile bodies, comprising a main metal frame for attachment to the body including connected outer and inner pairs of angle-iron side beams, and front and rear cross-beams connecting the ends of the inner side beams; said inner side beams adapted to extend along the outer side faces of the side beams of the chassis and having horizontal, inwardly-projecting wings which overlie the upper faces of said chassis beams, and the outer side beams of the frame extending rearwardly beyond the inner side beams and having a transversely-arranged end beam connecting their rear ends; stop blocks fitted in the rear corners of the frame for engagement by the rear ends of the chassis side beams, a horizontal beam disposed parallel with and midway between the side beams of the main frame in a plane below that of said main frame and having up-turned arms connected to said end beam and to the rear cross-beam of the main frame, and an upright auxiliary frame fastened to the rearwardly-extending portions of the outer side beams of the main frame and connecting the same together; said auxiliary frame having means associated with it for holding against it a spare tire supported at its lower portion upon the body of said horizontal beam.

In testimony whereof I affix my signature.

JUAN P. RAVELO.